United States Patent [19]
Kurakake et al.

[11] Patent Number: 4,945,496
[45] Date of Patent: Jul. 31, 1990

[54] APPARATUS FOR CONVOLUTION PICTURE PROCESSING USING DELAY AND INTERMEDIATE STORAGE

[75] Inventors: Mitsuo Kurakake; Shoichi Otsuka, both of Hino; Yutaka Muraoka, Hachioji, all of Japan

[73] Assignee: Fanuc Ltd, Minamitsuru, Japan

[21] Appl. No.: 130,240

[22] PCT Filed: May 23, 1987

[86] PCT No.: PCT/JP87/00330

§ 371 Date: Nov. 25, 1987

§ 102(e) Date: Nov. 25, 1987

[87] PCT Pub. No.: WO87/07412

PCT Pub. Date: Dec. 3, 1987

[30] Foreign Application Priority Data

May 23, 1986 [JP] Japan ................................ 61-118686

[51] Int. Cl.⁵ .......................... G06F 15/68; G06F 9/38
[52] U.S. Cl. ............................... 364/518; 364/728.01; 364/900; 364/920.7; 358/464; 382/42; 382/54
[58] Field of Search ... 364/200 MS File, 900 MS File, 364/521, 518, 728.01, 728.06, 728.03, 728.05; 382/42, 52, 54; 358/448, 463, 464, 903

[56] References Cited

U.S. PATENT DOCUMENTS

| | | | |
|---|---|---|---|
| 4,135,247 | 1/1979 | Gordon et al. | 364/414 |
| 4,328,426 | 5/1982 | D'Ortenzio | 358/280 |
| 4,398,176 | 8/1983 | Dargel et al. | 382/27 |
| 4,635,292 | 1/1987 | Mori et al. | 382/41 |
| 4,785,409 | 11/1988 | Badono et al. | 364/518 |

FOREIGN PATENT DOCUMENTS

123964 7/1985 Japan .

*Primary Examiner*—Gary V. Harkcom
*Assistant Examiner*—Raymond J. Bayerl
*Attorney, Agent, or Firm*—Staas & Halsey

[57] ABSTRACT

A picture processing apparatus uses coefficient matrix data to perform convolution processing on a time-sharing basis with regard to each item of pixel data of a frame memory (3) which stores plural items of pixel data. When such processing is being performed, the results of addition from the adder (5) are delayed a predetermined period of time by delay device (7), thereby assuring that intermediate processing results may be written in the buffer (9) with certainty. At the same time, a read-out address of the buffer (9) is revised by an amount equivalent to the delay in the write timing, thereby making it possible to speed up the time-sharing convolution processing.

7 Claims, 6 Drawing Sheets

| $C_{11}$ | $C_{12}$ | $C_{13}$ | $C_{14}$ | $C_{15}$ |
|---|---|---|---|---|
| $C_{21}$ | $C_{22}$ | $C_{23}$ | $C_{24}$ | $C_{25}$ |
| $C_{31}$ | $C_{32}$ | $C_{33}$ | $C_{34}$ | $C_{35}$ |
| $C_{41}$ | $C_{42}$ | $C_{43}$ | $C_{44}$ | $C_{45}$ |
| $C_{51}$ | $C_{52}$ | $C_{53}$ | $C_{54}$ | $C_{55}$ |

FIG. 4(b)

| $A_{11}$ | $A_{12}$ | $A_{13}$ | $A_{14}$ | $A_{15}$ | $A_{16}$ | ---------- | $A_{1256}$ |
|---|---|---|---|---|---|---|---|
| $A_{21}$ | $A_{22}$ | $A_{23}$ | $A_{24}$ | $A_{25}$ | $A_{25}$ | ---------- | $A_{2256}$ |
| $A_{31}$ | $A_{32}$ | $A_{33}$ | $A_{34}$ | $A_{35}$ | $A_{36}$ | ---------- | $A_{3256}$ |
| $A_{41}$ | $A_{42}$ | $A_{43}$ | $A_{44}$ | $A_{45}$ | $A_{46}$ | ---------- | $A_{4256}$ |
| $A_{51}$ | $A_{52}$ | $A_{53}$ | $A_{54}$ | $A_{55}$ | $A_{56}$ | ---------- | $A_{5256}$ |
| $A_{61}$ | $A_{62}$ | $A_{63}$ | $A_{64}$ | $A_{65}$ | $A_{66}$ | ---------- | $A_{6256}$ |
| ⋮ | ⋮ | ⋮ | ⋮ | ⋮ | ⋮ | ---------- | ⋮ |
| $A_{2561}$ | $A_{2562}$ | $A_{2563}$ | $A_{2564}$ | $A_{2565}$ | $A_{2566}$ | ---------- | $A_{256256}$ |

| 1 | 2 | 3 | 4 | ... | 254 | 255 | 256 |
|---|---|---|---|-----|-----|-----|-----|
| * | * | $\sum_{j=1}^{5} C_{1j}A_{1j}$ | $\sum_{j=2}^{6} C_{1j}A_{1j}$ | ... | $\sum_{j=252}^{256} C_{1j-251}A_{1j}$ | * | * |

FIG. 6(b) PRIOR ART

| * | * | $\sum_{i=1}^{2}\sum_{j=1}^{5} C_{ij}A_{ij}$ | $\sum_{i=1}^{2}\sum_{j=2}^{6} C_{ij-1}A_{ij}$ | ... | $\sum_{i=1}^{2}\sum_{j=252}^{256} C_{ij-251}A_{ij}$ | * | * |

FIG. 6(c) PRIOR ART

| * | * | $\sum_{i=1}^{3}\sum_{j=1}^{5} C_{ij}A_{ij}$ | $\sum_{i=1}^{3}\sum_{j=2}^{6} C_{ij-1}A_{ij}$ | ... | $\sum_{i=1}^{3}\sum_{j=252}^{256} C_{ij-251}A_{ij}$ | * | * |

FIG. 6(d) PRIOR ART

| * | * | $\sum_{i=1}^{4}\sum_{j=1}^{5} C_{ij}A_{ij}$ | $\sum_{i=1}^{4}\sum_{j=2}^{6} C_{ij-1}A_{ij}$ | ... | $\sum_{i=1}^{4}\sum_{j=252}^{256} C_{ij-251}A_{ij}$ | * | * |

FIG. 6(e) PRIOR ART

| * | * | $\sum_{i=1}^{5}\sum_{j=1}^{5} C_{ij}A_{ij}$ | $\sum_{i=1}^{5}\sum_{j=2}^{6} C_{ij-1}A_{ij}$ | ... | $\sum_{i=1}^{5}\sum_{j=252}^{256} C_{ij-251}A_{ij}$ | * | * |

APPARATUS FOR CONVOLUTION PICTURE PROCESSING USING DELAY AND INTERMEDIATE STORAGE

BACKGROUND OF THE INVENTION

This invention relates to a picture processing apparatus. More particularly, this invention is directed to a picture processing apparatus for performing convolution processing on plural items of pixel data stored in a frame memory, on a time-sharing basis using a predetermined coefficient matrix comprising rows and colums.

For such purposes as sharpening a picture, removing background noise from a picture, etc., conventional practice is to perform convolution processing on pixel data in a frame memory using a predetermined weighted coefficient matrix comprising rows and columns.

Figure 4A:
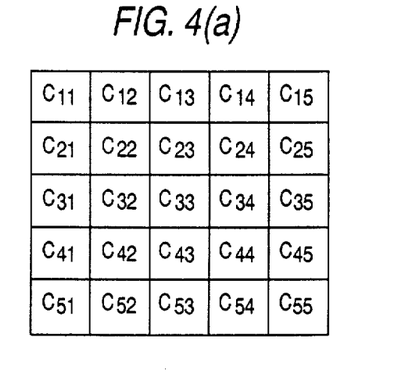
FIG. 4(a) is a table showing a coefficient matrix in a coefficient memory.
Figure 4B:
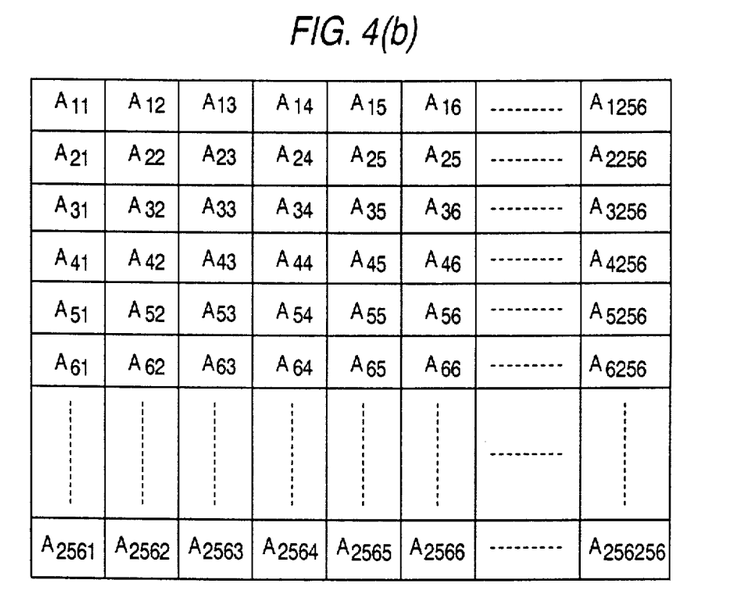
FIG. 4(b) is a table showing pixel data in a frame memory that are to be subjected to convolution processing.

FIG. 4(a) illustrates a coefficient matrix of five rows and five columns, and FIG. 4(b) illustrates 256×256 items of pixel data $A_{11}, A_{12}, \ldots, A_{256256}$ in a frame memory. Weighted coefficients $C_{11}, C_{12}, \ldots, C_{55}$ in the coefficient matrix have weighted values for attaining the aforementioned purposes.

In order to perform convolutioon processing with regard to the pixel data in a frame memory of the kind shown in FIG. 4(b) with a coefficient matrix of the kind shown in FIG. 4(a), a convolution processor is used. With a conventional processor, partial convolution processing is performed with regard to one predetermined row of pixel data in the frame memory. The results of this intermediatre processing are stored in a buffer RAM. Next, the intermediate results just stored in the buffer RAM are read out, and added to the results of the next partial convolution processing obtained from the convolution processor. The resulting sum is repeatedly stored at the address in the buffer RAM where the preceding intermediate processing results were stored, and the sum is read out from this address. Thus, convolution processing is performed on a time-sharing basis.

Figure 6A:
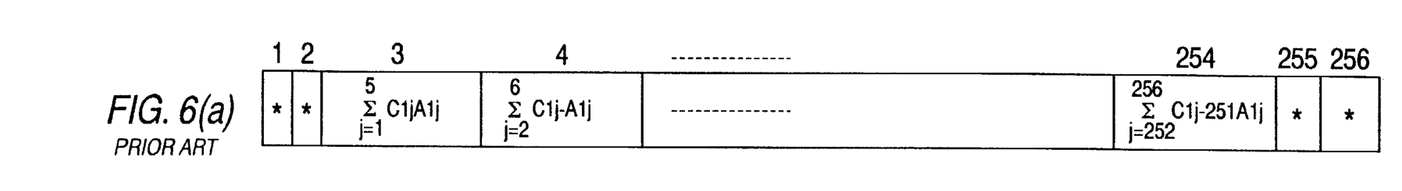
FIG. 6 is a table showing the manner in which intermediate processing results are stored in a buffer RAM in accordance with the conventional apparatus.
Figure 6B:
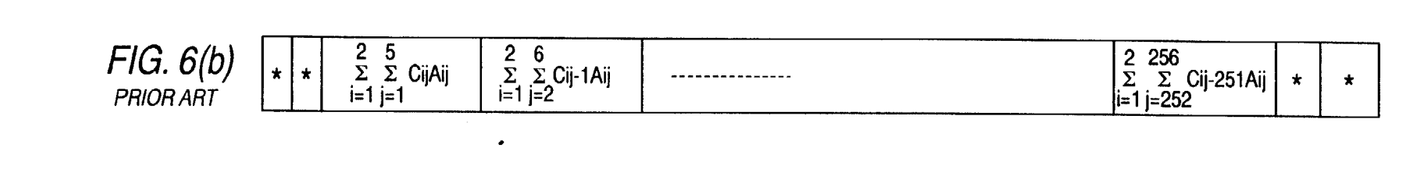

With the 5×5 coefficient matrix of the kind shown in FIG. 4(a), for example, this time-sharing convolution processing is executed by being split into five stages. When the convolution processing is performed with respect to the third row of pixel data in FIG. 4(b), partial convolution processing is carried out between the first row of the coefficient matrix and the first through 256 columns of pixel data in the first row in the first stage of processing. As shown in FIG. 6, $$\sum_{j=1}^{5} C_{ij} \times A_{ij}, \sum_{j=2}^{6} C_{ij-1} \times A_{ii}, \ldots, \sum_{J=252}^{256} C_{ij-251} \times A_{ij}$$

is stored in third through 254th columns of the first row of the buffer RAM as the respective intermediate processing results of the convolution processing. At this time, invalid data (indicated by the symbol "*" in the drawings) enter the first, second, 255th and 256th columns. Next, in the second stage of processing, the intermediate processing results stored in the buffer RAM are read out and, at the same time, the convolution processor performs partial convolution processing between the second row of the coefficient matrix and the first through 256th columns of pixel data in the second row. These partial results and the preceding intermediate processing results stored in a data latch circuit are added and the new intermediate processing results obtained from the addition are stored by rewriting the preceding intermediate processing results in the third through 254th columns of the buffer RAM, as shown in FIG. 6(b), at a write timing controlled by a bus buffer. Thus, $$\sum_{i=1}^{2}\sum_{j=1}^{5} C_{ij} \times A_{ij}, \sum_{i=1}^{2}\sum_{j=2}^{6} C_{ij-1} \times A_{ij}, \ldots,$$

$$\sum_{i=1}^{2}\sum_{j=252}^{256} C_{ij-251} \times A_{ij}$$

are written in the third through 254th columns of the buffer RAM.

Figure 6C:
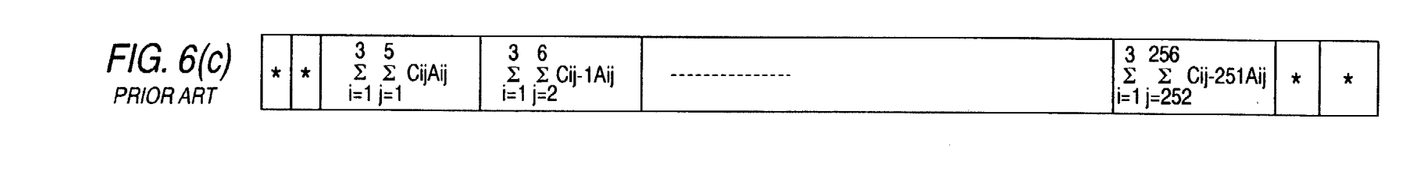
Figure 6D:
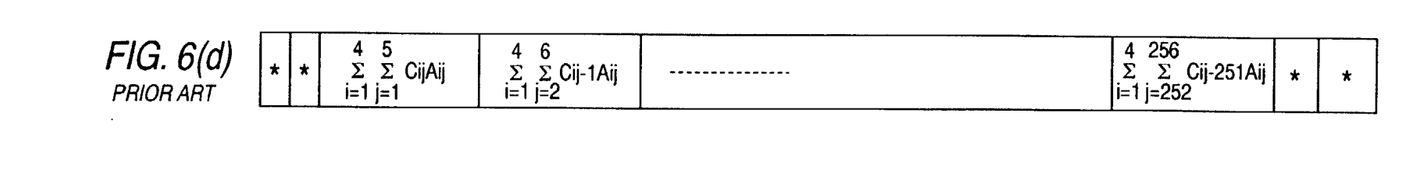
Figure 6E:
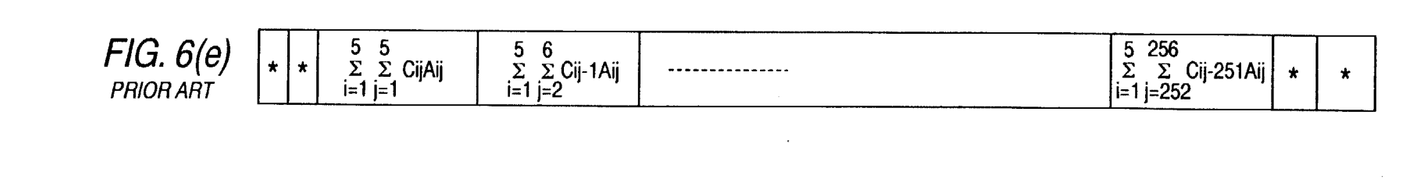

The third, fourth and fifth stages of processing are executed through this procedure to store intermediate processing results of the kind shown in FIGS. 6(c), (d) and (e) in the first row of the buffer RAM. When the fifth stage of processing is performed, 5×5 matrix convolution processing with respect to the third row of the frame memory will be completed, so that results of the kind shown in FIG. 6(e) can be obtained. In other words, $$\sum_{i=1}^{5}\sum_{j=1}^{5} C_{ij} \times A_{ij}, \sum_{i=1}^{5}\sum_{j=2}^{6} C_{ij-1} \times A_{ij}, \ldots,$$

$$\sum_{i=1}^{5}\sum_{j=252}^{256} C_{ij-251} \times A_{ij}$$

However, when the high-speed processing is attempted with this convolution apparatus for performing convolution processing on a time-sharing basis, a prescribed period of time is required for reading the intermediate processing results from the buffer RAM to the data latch circuit and for adding the intermediate processing results stored in the latch data circuit and the next convolution processing results from the convolution processor. Accordingly, a problem arises in that there is inadequate time for writing the intermediate processing results data in the buffer RAM.

Figure 5A:
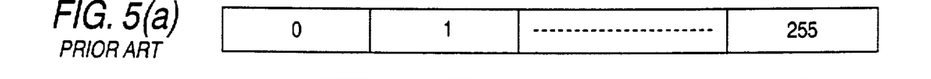
FIG. 5 is a timing diagram of convolution processing in a conventional picture processing apparatus.
Figure 5B:
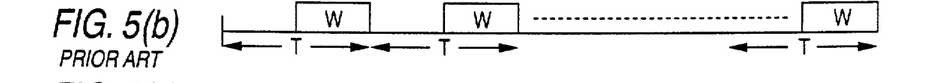

For example, as shown in the timing chart of FIG. 5, if convolution processing is performed on one row of pixel data in the frame memory of FIG. 5(a), a time T, or a processing frequency f, needed for one partial convolution processing performed by the convolution processor will be a video rate of 167 ns, as shown in FIG. 5(b). In other words, the processing will be executed at 6 MHz. Therefore, it is necessary that the contents of the buffer RAM be read R and written W at this rate.

Though a buffer RAM capable of operating at high speed is used, the access time is 50 ns with C-MOS-type RAMs that are presently available.

Figures 5C, 5D:
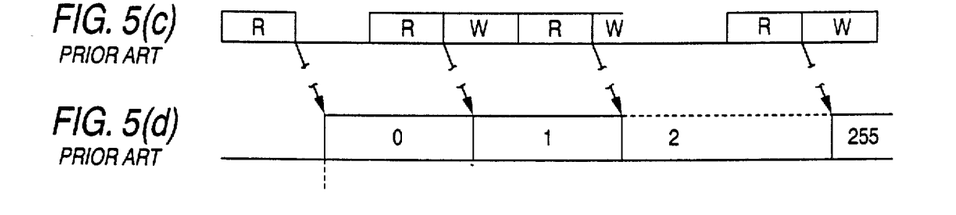

FIG. 5(b) illustrates the timing at which the first stage of convolution processing results are written (W) in the buffer RAM, and FIG. 5(c) shows the second stage of timing at which the intermediate processing results stored in the buffer RAM in the first stage of processing are read (R) and the sum obtained by adding these results to the next processing results are written (W) in the buffer RAM. It will be understood from FIGS. 5(c) and (d) that after the intermediate processing results stored in the buffer RAM in accordance with the first stage of processing are read (R) and stored in the data latch circuit, the timing for outputting the results from the latch circuit to the adder is delayed a predetermined period of time.

Figure 5E:
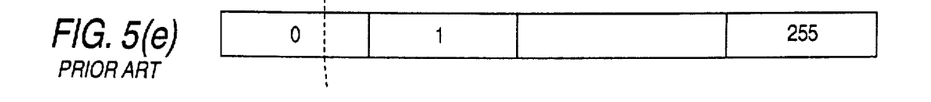
Figure 5F:
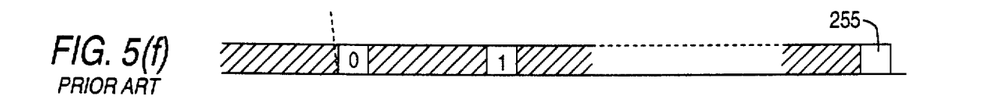
Figure 5G:
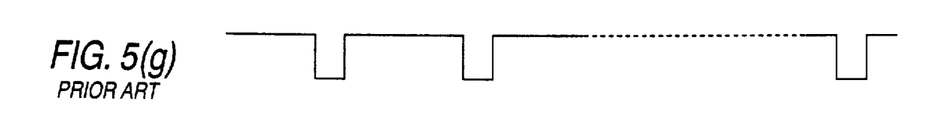

FIG. 5(e) illustrates the output of processing results at the next processing cycle of the convolution processor. FIG. 5(f) illustrates the timing for adding the results obtained in the next processing cycle of the convolution processor and the output from the data latch circuit shown in FIG. 5(d). The hatched portion indicates that the output of the adder is not valid. The timing at which the results of addition obtained from the adder are written in the buffer RAM is shown in FIG. 5(g). This is done by bus buffer on/off control and a buffer RAM write-enable signal. It will be understood from FIGS. 5(f) and (g) that since the results of addition obtained from the adder are considerably delayed with respect to the timing at which these results are written in the buffer RAM, the intermediate processing results cannot be stored in the buffer RAM with certainty.

Thus, since the processor executes convolution processing at the video rate of 167 ns, there is a limitation with read/write control of a RAM having an access time of 50 ns. In order to avoid this read/write temporal limitation, the conventional apparatus is so adapted that the convolution processing is executed in twice the period, i.e., at a time equivalent to 2×T. As a result, picture processing cannot be increased.

SUMMARY OF THE INVENTION

An object of the present invention is to provide a picture processing apparatus in which read/write control can be performed with certainty and ro increase the speed of the convolution processing even is use is made of a RAM having an access time of 50 ns with respect to a video rate of, e.g., 167 ns.

In accordance with the present invention, there is provided a picture processing apparatus including a frame memory storing plural items of pixel data, a convolution processor for executing convolution processing with regard to each item of pixel data in the frame memory on a time-sharing basis with coefficient matrix data, a buffer RAM for storing intermediate processing results obtained from the convolution processor, an adder for reading out the intermediate processing results stored in the buffer RAM and adding these results to the intermediate processing results obtained from the convolution processor in the next processing cycle, a delay circuit for delaying the addition results from the adder for a predetermined time period and storing the addition results by rewriting the intermediate processing results in the buffer RAM, and addressing means for designating a write address in the buffer RAM and for designating a read address of the buffer RAM upon revising the read address by an amount equivalent to a shift in the write address due to the delay time of the delay circuit.

DESCRIPTION OF THE PREFERRED EMBODIMENT

An embodiment of the invention will now be described in detail with reference to the drawings.

Figure 1:
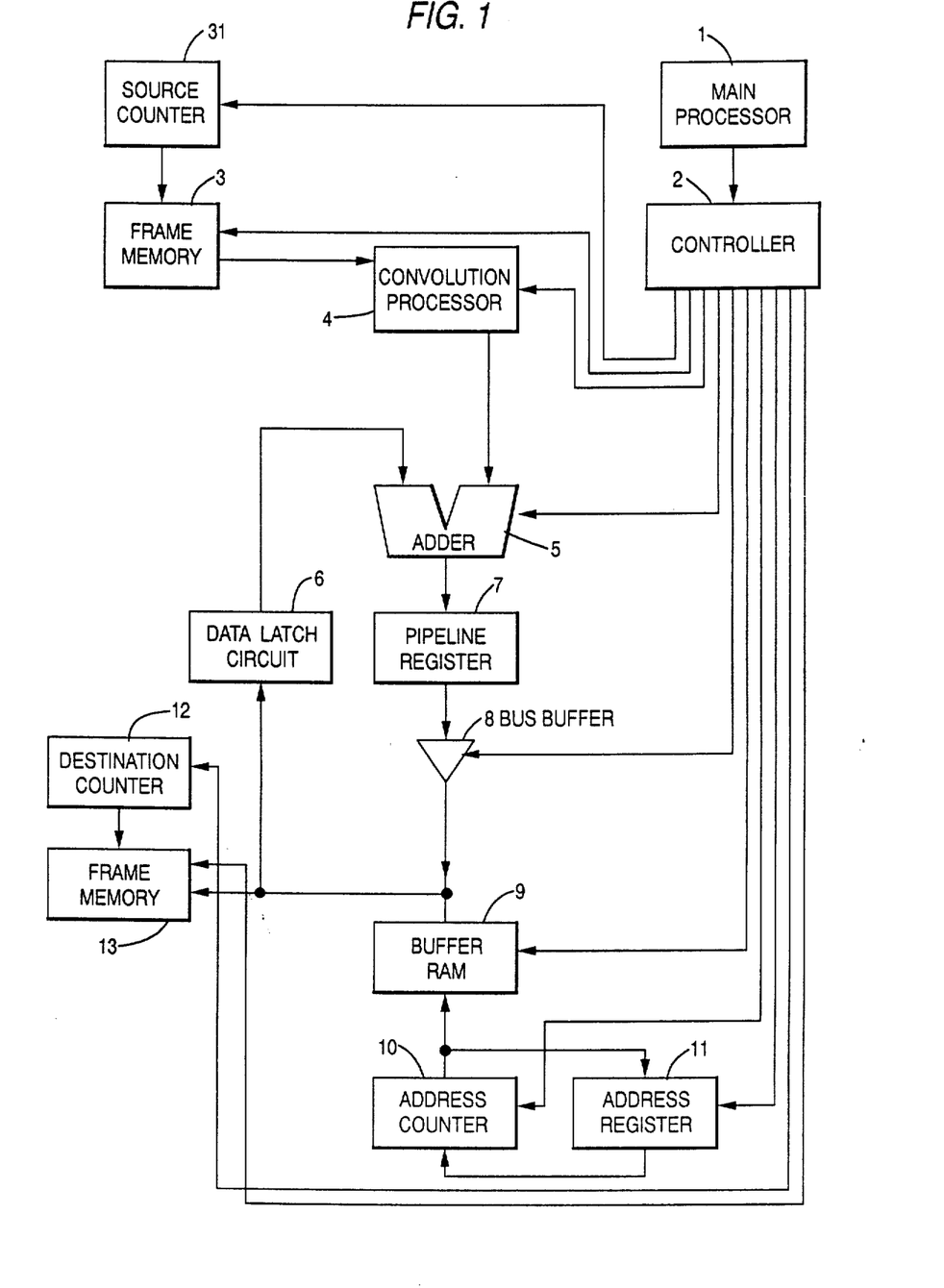
FIG. 1 is a block diagram showing a picture processing apparatus according to the present invention for performing time-sharing convolution processing.

FIG. 1 is a block diagram showing a picture processing apparatus for performing time-sharing convolution processing according to the present invention. A main processor 1 provides a controller 2 with a command for controlling convolution processing. On the basis of this command, the controller 2 outputs control signals for time-sharing convolution processing.

Picture data composed of, e.g., 256×256 pixels, are stored beforehand in a frame memory 3. A read-out address is designates by a source counter 31. On the basis of a control signal from the controller 2, the source counter 31 designates the address of the frame memory 3, whereby pixel data of a predetermined row and column that is the object of processing is outputted from the frame memory 3 to a convolution processor 4. The convolution processor 4 performs convolution processing on a time-sharing basis, e.g., in five stages, with respect to the predetermined pixel data from the frame memory, e.g., a 5×5 coefficient matrix in a coefficient memory (not shown). The output of the convolution processor 4 is applied to one input of an adder 5. Applied to the other input of the adder 5 are output data from a data latch circuit 6. The adder 5 adds intermediate processing results from the convolution processor 4 and previous intermediate processing results from the latch circuit 6. The effective period of the output of adder 5 is determined by a control signal from the controller 2.

The output of the adder 5 is applied to a delay circuit, e.g., a pipeline register 7. The pipeline register 7 is formed by, for example, a D-type flip-flop and delays the output of the adder 5 until the start of the next convolution processing cycle. The output of the pipeline register 7 is applied to a bus buffer 8. The bus buffer 8 is on/off controlled by a control signal from the controller 2. It is possible for the output of the pipeline register 7 to be written into a buffer RAM 9 during the time that the bus buffer 8 is on. Since the output of the adder 5 is delayed by the pipeline register 7, the starting address for writing data in the RAM 9 is shifted by +1 whenever intermediate processing results are added.

The buffer RAM 9 stores the intermediate processing results of time-shared convolution processing and is adapted to store the intermediate processing results of time-shared processing with respect to one row of pixel data in frame memory 3. In the prior art, it will suffice if the RAM is large enough to store 256 pixels. In accordance with the present invention, however, the address is incremented each time intermediate processing results are obtained owing to the provision of the pipeline register 7. With time-sharing processing performed in five stages, an additional area equivalent to four pixels is required.

An address counter 10 applies a write/read address to the buffer RAM 9 under the control of the controller 2. When data are written in the buffer RAM 9, a starting address for writing the intermediate processing results of the first stage and starting addresses for writing subsequent intermediate processing results are successively incremented by +1 address. Also, when reading data out of the buffer RAM 9, it is required that starting addresses for reading out the intermediate processing results of the first, second, third, fourth and fifth stages be incremented by +1 as set forth above. An address register 11 is provided for this purpose.

By effecting the operation in such a manner that an address value incremented by +1 over the starting address of each intermediate processing is preset from the address counter 10, "+1" will be stored in the address register 11. Whenever each partial convolution processing cycle ends, the value in the address register 11 is preset in the address counter 10 as the startinig address value of the address counter 10 under the control of the controller 2, thereby incrementing the starting address by +1. With the first stage of intermediate processing, however, the counter 10 is cleared to start from address 1. When intermediate processing results are read out, the address counter 10 sends the intermediate processing results, the address being disengaged by the address counter 10, to the data latch circuit 6.

When five stages of partial convolution processing of one row have been performed, the complete convolution results regarding pixels corresponding to the third row of frame memory 3, namely $$\sum_{i=1}^{5} \sum_{j=n}^{n+4} C_{ij-n+1} \times A_{ij},$$

are output from the adder 5. Thus, the results of convolution processing regarding the fourth, fifth, ..., 254th rows of the frame memory 3 are successively output at every five stages of partial convolution. Therefore, these results can be transferred to a frame memory 13. A destination counter 12 is used for the transfer.

The operation of the invention will now be described with reference to FIGS. 2 and 3.

FIG. 2 is a timing diagram of the write/read timing with respect to the buffer RAM 9. FIGS. 3(a) through (d) illustrate the manner in which intermediate processing results are written in the buffer RAM 9 in first, second, third and fourth stages, respectively.

Figures 3A, 3B, 3C:
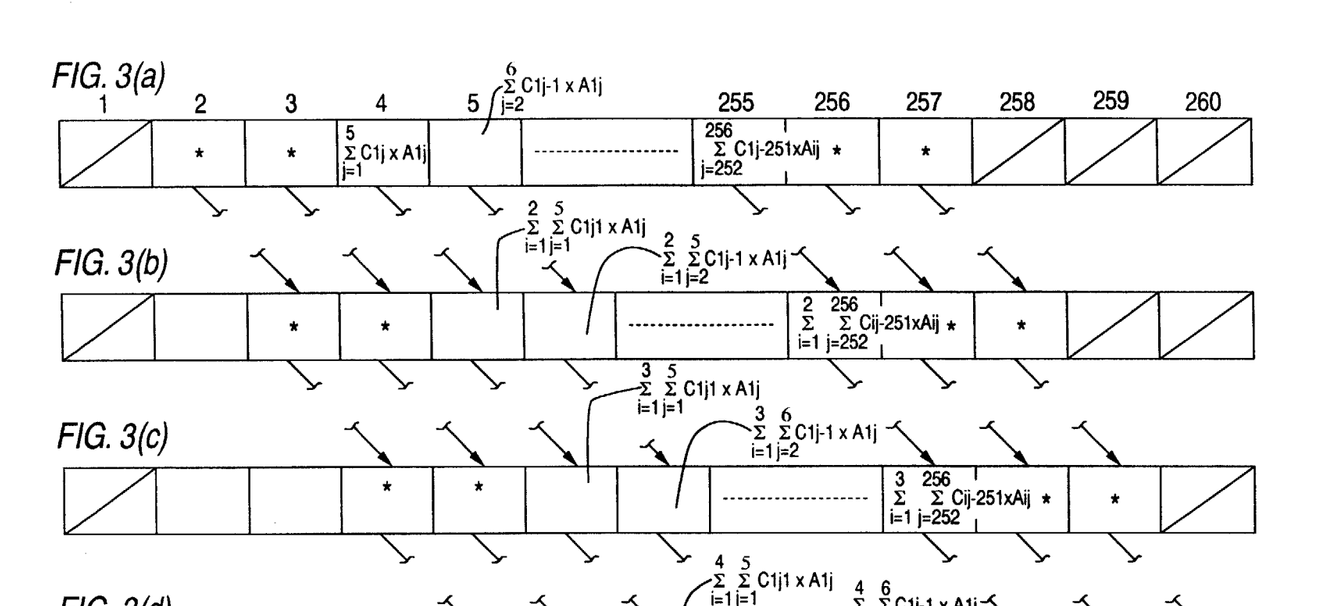
FIG. 3 is a table showing the manner in which intermediate processing results are stored in a buffer RAM in accordance with the present invention.
Figures 3D, 3E:
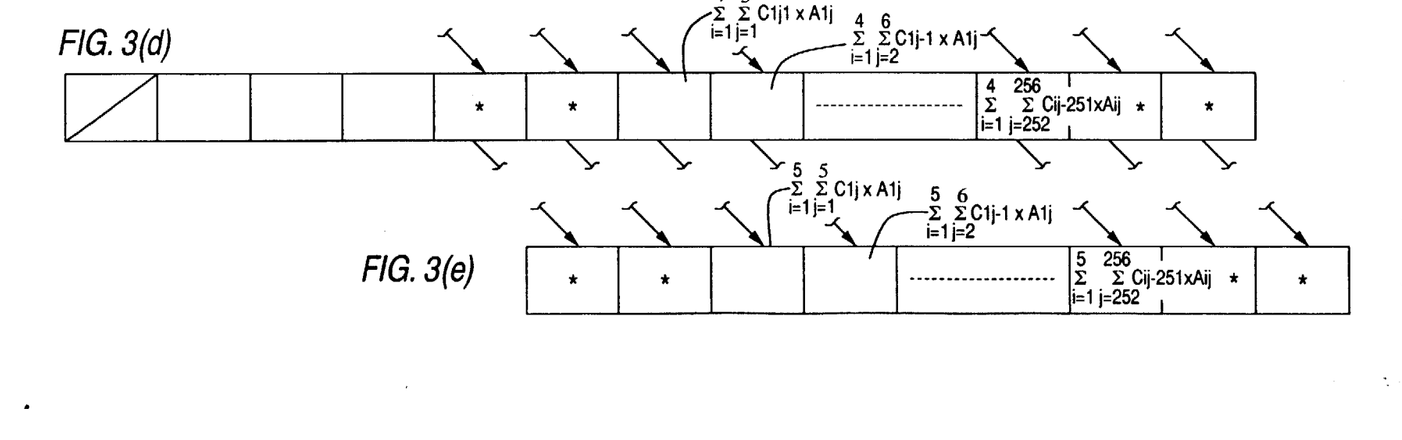

FIG. 3(e) illustrates the results of the fifth stage of processing, namely the complete convolution results. The results of the fifth stage of processing are stored in the frame memory 13 directly without being written in the buffer RAM 9.

Figure 2A:
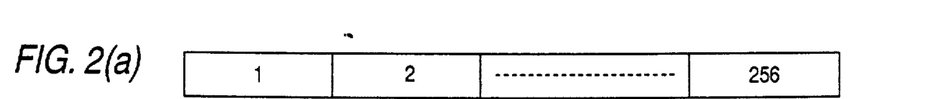
FIG. 2 is a time chart of time-sharing convolution processing according to the present invention in FIG. 1.
Figure 2B:
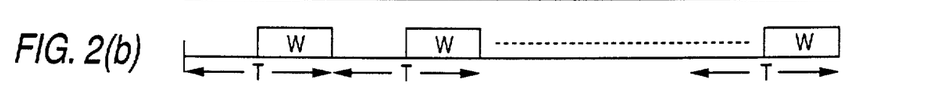

FIG. 2(a) shows one row of pixel data in the frame memory 3, and FIG. 2(b) is a first cycle of write timing with respect to the buffer RAM 9.

When writing the first cycle of intermediate processing results, it is assumed that the contents of the data latch circuit 6 are cleared without reading data out of the buffer RAM 9. The first stage of intermediate processing results from the convolution processor 4 are stored at the second through 257th addresses of the buffer RAM 9, as shown in FIG. 3(a). Here the data at the second, third, 256th and 257th addresses are invalid data.

Figure 2C:
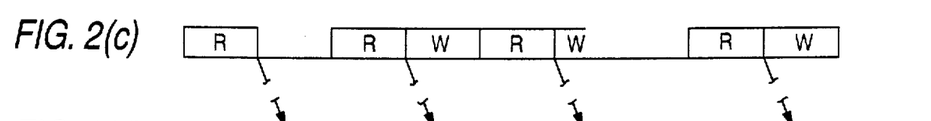
Figure 2D:
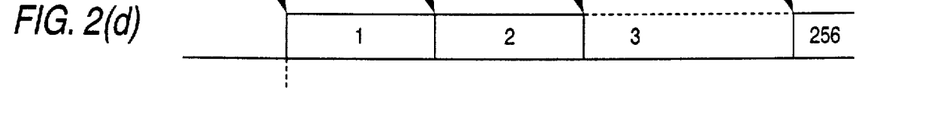
Figure 2E:
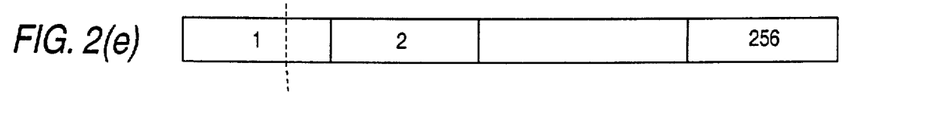
Figure 2F:
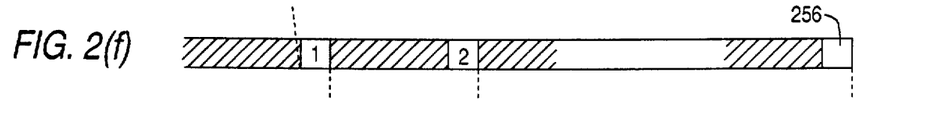
Figure 2G:
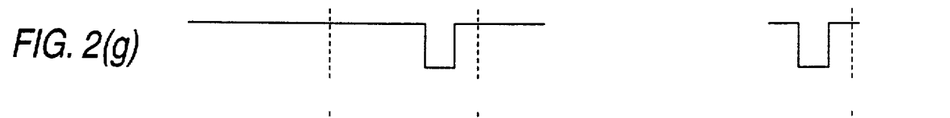

As for writing the second stage of intermediate processing results, first the data written in the buffer RAM 9 from the second to the 257th addresses are read out at the timing R shown in FIG. 2(c), and these data are stored in the data latch circuit 6. Next, the first stage of intermediate processing results stored in the latch circuit 6 are read out at the timing shown in FIG. 2(d), these results are added to the next intermediate processing results from the convolution processor 4 by the adder 5 at the timing shown in FIG. 2(f). The results of the addition are delayed by the pipeline second stage of intermediate processing results are written in the buffer RAM 9 at the timing shown in FIG. 2(g) by controlling the bus buffer 8 by controller 2, as mentioned above. The starting address of buffer RAM 9 at which the second stage of intermediate processing results are stored is shifted by an address of "+1", as will be understood from FIGS. 2(a)-2(h). Thus, the intermediate processing results of the second stage are written in the buffer RAM 9 from the third address to the 258th address, as shown in FIG. 3(b). Here the data at the third, fourth, 257th and 258th addresses, namely the two pixels of data at the left and the two pixels of data at the right, are invalid data.

Next, as for writing the third stage of intermediate processing results, the intermediate processing results of the second stage stored in the buffer RAM 9 from the third to the 258th addresses must be read out and stored in the data latch circuit 6. However, the third address incremented by +1 from the second address, which is the starting address of the second cycle, is preset in the address counter 10 by the address register 11. As a result, it is possible to read from the third address of the buffer RAM 9. Here control is exercised by the controller 2 in such a manner that an address value incremented by +1 from the starting address of intermediate processing is preset in the address register 11 from the address counter 10 at all times.

Thus, in the third stage of writing, the intermediate processing results of the third stage are written in the buffer RAM 9 from the fourth to the 259th addresses, as shown in FIG. 3(c). When the fourth stage of writing is performed, the initial value "1" now in the address counter 10 is preset to "4" by the address register 11 and the intermediate processing results of the third stage are read out from the fourth address of the buffer RAM 9 and stored in the data latch circuit 6. In the fourth stage of writing, the intermediate processing results of the fourth stage are written in the buffer RAM 9 from the fifth to the 260th addresses, as shown in FIG. 3(d). Thus, in the fifth stage, the complete convolution results shown in FIG. 3(e) are stored in the third row of the frame memory 13 directly without being written in the buffer RAM 9.

Figure 2H:
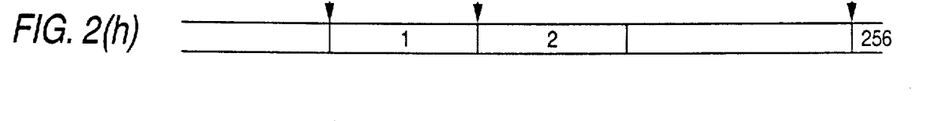

Thus, as set forth above, the pipeline register 7 is provided behind the adder 5 and the timing at which the intermediate processing results are written is delayed by one address by the pipeline method, as illustrated in FIG. 2(h). As a result, there is no drop in the high processing speed of the convolution processor 4. In other words, the intermediate processing results can be written in the buffer RAM 9 reliably without the predetermined processing cycle T of the convolution processor 4 being affected. Furthermore, with the one-address of the write timing, the intermediate processing results of the previous processing cycle written in synchronism with the immediately preceding write timing can be read out reliably by incrementing the starting address of the address counter 10 by +1" whenever the intermediate processing results are to be read.

Though an embodiment of the present invention has been described, the invention is not limited thereto but can be modified in various ways within the gist of the invention without departing from the scope of the claims thereof.

In accordance with the picture processing apparatus of the present invention, a delay circuit such as a pipeline register is provided behind an adder and intermediate processing results from the adder are coordinated with the timing at which data are written into a buffer RAM. This makes it possible to write data in the buffer RAM with assurance and, at the same time, enables an increase in the convention processing speed.

Further, in the present invention an address counter and an address register are combined to designate the address of the buffer RAM. The initial value in the address counter is revised and set to a value which takes into account a shift in the write address. Accordingly, predetermined intermediate processing results are reliably read out of the buffer RAM.

We claim:

1. A picture processing apparatus for performing convolution processing with respect to plural items of pixel data on a simultaneous basis with a predetermined coefficient matrix including rows and columns, said picture processing apparatus comprising:
   a frame memory storing plural items of pixel data;
   processing means, coupled to said frame memory, for executing convolution processing with respect to each item of said pixel data on a simultaneous basis with data from the coefficient matrix;
   buffer means, coupled to said processing means, for storing intermediate processing results obtained by said processing means;
   adding means, coupled to said processing means, for adding the stored intermediate processing results to intermediate processing results obtained from said processing means during a next processing cycle, and for outputting addition results;
   delay means, coupled between said adding means and said buffer means, for providing a delay time and delaying the output of the addition results for the delay time and storing the addition results in said buffer means by rewriting the intermediate processing results in said buffer means; and
   addressing means, coupled to said buffer, for designating a write address of said buffer means and for designating a read address of said buffer means upon revising the read address by an amount equivalent to a shift in the write address due to the delay time set by said delay means.

2. A picture processing apparatus according to claim 1, further comprising data latch means, coupled to said adding means, for reading out intermediate processing results of a preceding cycle to said adding means during the next processing cycle of said processing means.

3. A picture processing apparatus according to claim 1, wherein said delay means comprises a pipeline register.

4. A picture processing apparatus for performing convolution processing with respect to plural items of pixel data on a simultaneous basis with a predetermined coefficient matrix including rows and columns, said picture processing apparatus comprising:
   a frame memory storing plural items of pixel data;
   processing means, coupled to said frame memory, for executing convolution processing with respect to each item of said pixel data on a simultaneous basis with data from the coefficient matrix;
   buffer means, coupled to said processing means and having a storage capacity dependent upon coefficient matrix data from said processing means, for storing intermediate processing results obtained by said processing means;
   adding means, coupled to said processing means, for adding the stored intermediate processing results to intermediate processing results obtained from said processing means during a next processing cycle, and for outputting addition results;
   delay means, coupled between said adding means and said buffer means, for providing a delay time and delaying the output of the addition results for the delay time and delaying the output of the addition results for the delay time and storing the addition results in said buffer means by rewriting the interediate processing results in said buffer means; and
   addressing means, coupled to said buffer, for designating a write address of said buffer means for designating a read address of said buffer means upon revising the read address by an amount equivalent to a shift in the write address due to the delay time set by said delay means.

5. A picture processing apparatus, comprising:
   a main processor providing commands for controlling convolution processing;
   a controller, connected to said main processor, for outputting control signals in accordance with the commands from said main processor and for controlling a simultaneous convolution processing;
   a frame memory, connected to said controller, for storing picture data formed of pixels;
   an address counter, connected to said frame memory and said controller, for designating a read out address of said frame memory on the basis of the control signals;
   a convolution processor, connected to said frame memory and said controller, for performing a time sharing convolution processing in accordance with the read out address from said frame memory and outputting a signal;
   a data latch circuit providing intermediate processing results;
   an adder, connected to said controller, said data latch circuit, and said convolution processor, for receiving and adding the output signal from said convolution processor and the intermediate processing results from said data latch circuit and outputting an added signal, said adder having an effective output period determined by said controller;
   a delay circuit, connected to said adder for receiving and delaying the added output signal until the start of a next convolution processing cycle;
   a bus buffer, connected to said delay circuit and said controller, for receiving the delayed added output signal;
   buffer means, connected to said bus buffer and said controller, for receiving the delayed added output signal during the time said bus buffer is on, and incrementing the address signal; and
   address means, connected to said address counter and said controller, for supplying a write/read address to said buffer means and incrementing the address.

6. A picture processing apparatus according to claim 5, wherein said buffer means is a random access memory (RAM).

7. A picture processing apparatus according to claim 6, wherein said address means comprises:
   an address register for storing incremented starting addresses; and
   an address counter connected to said address register and said buffer means.

* * * * *

UNITED STATES PATENT AND TRADEMARK OFFICE
CERTIFICATE OF CORRECTION

PATENT NO. : 4,945,496

DATED : JULY 31, 1990

INVENTOR(S) : MITSUO KURAKAKE ET AL.

It is certified that error appears in the above-identified patent and that said Letters Patent is hereby corrected as shown below:

Col. 2, line 32, "convolution" should be --conventional--.

Col. 3, line 29, "ro" should be --to--.

Col. 4, line 20, "designates" should be --designated--.

Col. 6, line 3, after "pipeline" insert --register 7. As shown in FIG. 2(h), this delayed--.

Signed and Sealed this

Twenty-seventh Day of August, 1991

*Attest:*

HARRY F. MANBECK, JR.

*Attesting Officer*      *Commissioner of Patents and Trademarks*